May 29, 1945.　　　　L. H. B. PEER　　　　2,377,175
DISPLAY APPARATUS
Filed Jan. 24, 1939　　　3 Sheets-Sheet 1
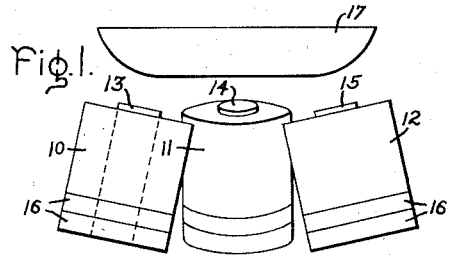
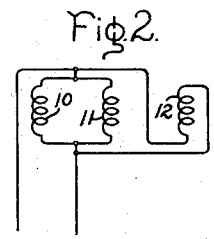
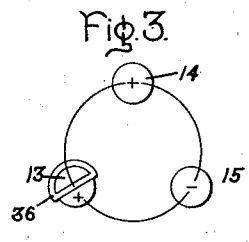
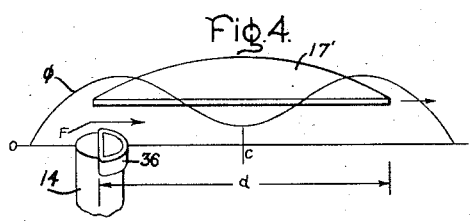
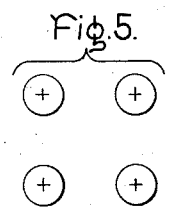
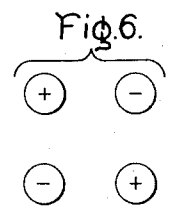
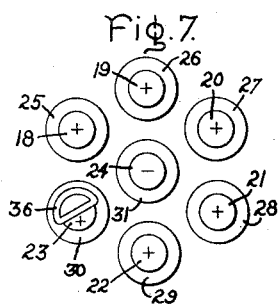
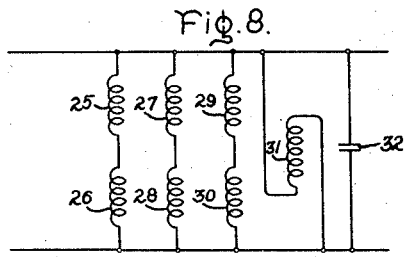
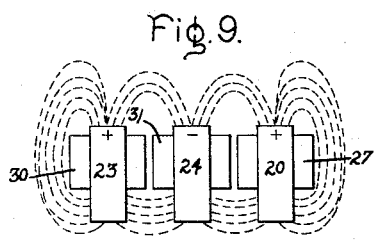
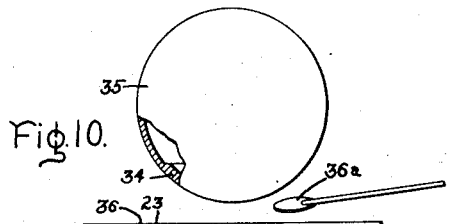
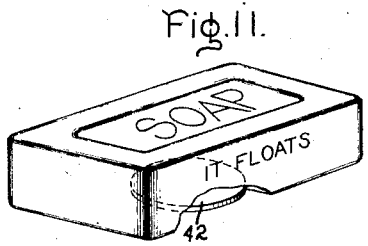
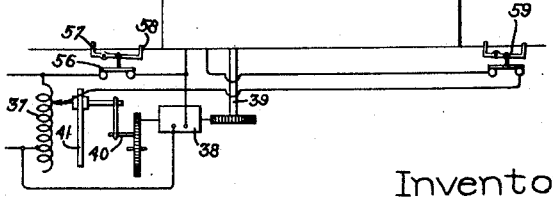
Inventor:
Lyle H. B. Peer,
by Harry E. Dunham
His Attorney.

May 29, 1945.  L. H. B. PEER  2,377,175
DISPLAY APPARATUS
Filed Jan. 24, 1939  3 Sheets-Sheet 2
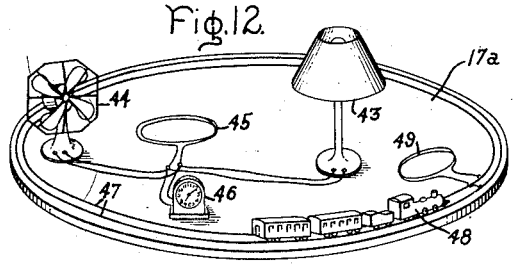
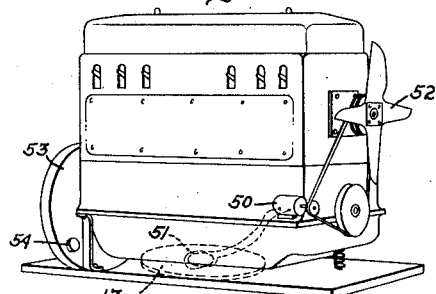
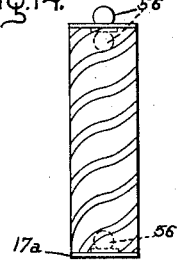
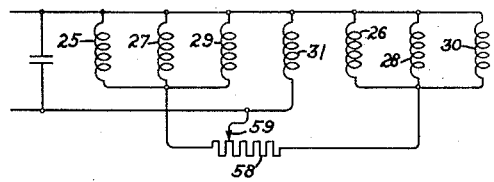
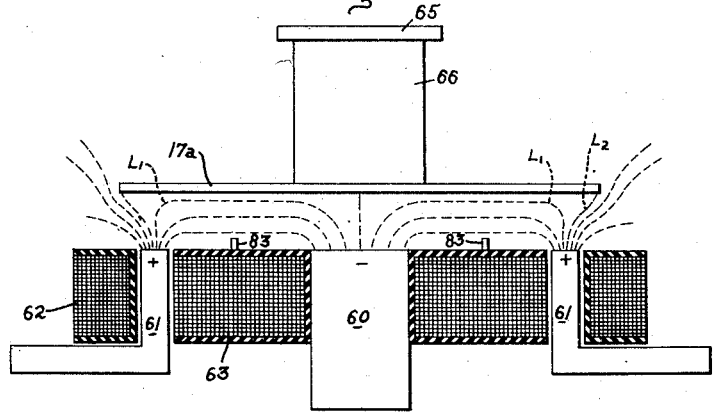
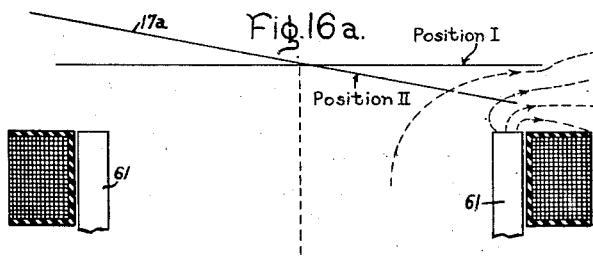
Inventor:
Lyle H. B. Peer,
by Harry E. Dunham
His Attorney.

May 29, 1945. L. H. B. PEER 2,377,175
DISPLAY APPARATUS
Filed Jan. 24, 1939  3 Sheets-Sheet 3
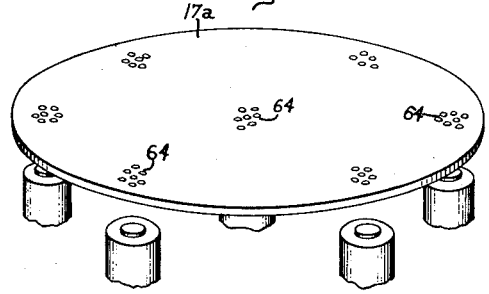
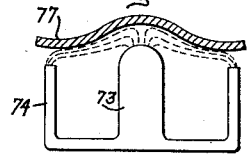
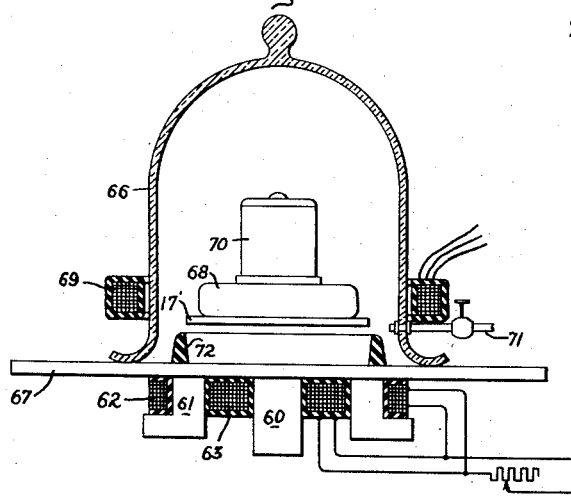
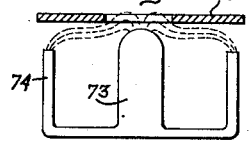
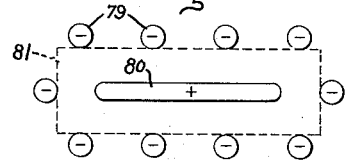
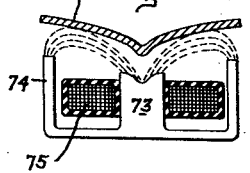
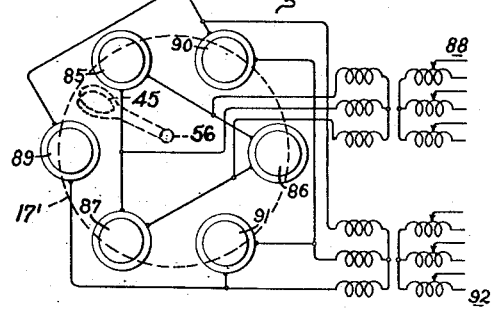
Inventor:
Lyle H. B. Peer,
by Harry E. Dunham
His Attorney.

Patented May 29, 1945

2,377,175

UNITED STATES PATENT OFFICE 2,377,175

DISPLAY APPARATUS

Lyle H. B. Peer, Schenectady, N. Y., assignor to General Electric Company, a corporation of New York Application January 24, 1939, Serial No. 252,688

17 Claims. (Cl. 172—120)

My invention relates to a method of and inductive repulsion apparatus for overcoming the force of gravity on metallic objects in such manner that such objects may be maintained in stabilized suspension without mechanical or other visible means of support. A further object of my invention is to control the suspended object or objects so that they may be raised and lowered and moved about and caused to rotate, etc., while so suspended. The apparatus in question is primarily useful for advertising and display purposes but may have other useful applications.

In carrying my invention into effect, I utilize the principle of electro-magnetic repulsion for overcoming the force of gravity on an armature body possessing electrical conductivity and in which eddy currents may be produced by means of an alternating magnetic field. The shape of the body or of the field or both is made such that the body is maintained in stabilized suspension. Then also the strength, shape and character of the alternating field is made controllable so as to control the movement of the suspended body. Electrical translating devices may be mounted on the suspended body and energized by electric currents induced in their energizing circuits through transformer effect by the supporting alternating field.

The features of my invention which are believed to be novel and patentable will be pointed out in the claims appended hereto. For a better understanding of my invention, reference is made in the following description to the accompanying drawings in which Fig. 1 illustrates a perspective view of a simple form of my invention; Fig. 2 is the circuit connection for the apparatus of Fig. 1; Fig. 3 illustrates the instantaneous polarity at the supporting field of the apparatus of Fig. 1 for stability; Fig. 4 is an explanatory illustration of the nature of the stabilized supporting field; Figs. 5 and 6 represent unstable and stable supporting fields respectively; Fig. 7 is a plan view of another very satisfactory stabilized field arrangement; Fig. 9 represents the nature of the average fluxes produced by the field of Fig. 7; Fig. 8 is a wiring diagram for the field of Fig. 7; Fig. 10 illustrates a display or exhibit apparatus employing automatic control and embodying my invention; Figs. 11 and 13 represent different forms of floating advertising displays; Fig. 12 represents a form of floating display for advertising electrical devices operated by power received inductively from the lifting field; Fig. 14 represents a floating and rotating barber pole display; Fig. 15 represents a split phase field energizing and controlling circuit; Fig. 16 represents a sectional view of a concentric two pole field producing apparatus; Fig. 16a represents an explanatory unstable modification of the apparatus of Fig. 16; Fig. 17 represents a floating platform display employing small permanent magnets thereon, Fig. 18 represents a centrifuge employing my invention; Figs. 19, 20 and 21 represent sectional side views of modifications of my invention where the supporting and stabilizing field is supplied by a single electromagnet; Fig. 22 represents in plan view outline a field and floating platform of oblong or rectangular shape; and Fig. 23 represents a plan view of a variable speed rotary driving and supporting field for a circular armature.

In Fig. 1 I have shown three coils 10, 11 and 12 having preferably laminated magnetic cores 13, 14 and 15. These three electromagnets are arranged in a triangle formation with the cores substantially vertical with the upper core ends substantially in the same horizontal plane. Preferably the upper ends of the electromagnets are slightly inclined towards a common center as illustrated. The lower ends of the cores preferably extend some distance below the coils to obtain a somewhat more satisfactory flux distribution. The disks 16 are simply for supporting the electromagnets in the upright positions shown and may be made of wood or asbestos or any other suitable non-magnetic non-conducting material. The coils are connected in parallel to an alternating current source, one coil being reversed with respect to the other two as represented in Fig. 2 so that the upper ends of the cores will have a polarity at a given instant as represented in Fig. 3.

This apparatus produces a strong alternating flux field from the pole pieces in a generally horizontal circular region above the pole pieces and is such as to float a disk or dish 17 armature of non-magnetic conducting material in the field above the pole pieces. Obviously eddy or secondary currents are induced in the conducting disk platform 17 and a repulsion effect takes place between the field emanating from the electromagnets and the current induced in disk 17 sufficient to overcome the force of gravity and maintain disk 17 floating in a stabilized field as illustrated at a distance above the tops of the electromagnets depending upon the field strength, the weight of the platform disk 17, and its conductivity. The field is strongest at the bottom of the region above the pole pieces and the armature sinks into this field to a point where the upward repulsion forces equal the weight of the armature. It is a relatively simple and well-understood matter to obtain a repulsion force between an A.-C. field and a conductor. However, it is not so simple to cause the conductor to remain suspended in a stabilized condition and so far as I am aware I am the first to accomplish such a result. By stabilized condition, I mean the condition that exists to prevent the disk 17 from moving to one side into a weak field which is insufficient to overcome the force of gravity. If the stabilized condition did not exist, the disk 17 would simply move to one side and then fall.

The conditions for bringing about stability are not, at present fully understood and are apparently of a complicated nature but I have, after considerable experimentation, obtained such stability in the apparatus above described and in other arrangements hereinafter referred to. In Fig. 1 the disk shape of the floating conductor is apparently beneficial but not essential in obtaining stability. For example, a plain circular disk platform such as indicated in Fig. 4 at 17' will float in a stabilized condition above the three-core electromagnet. Also, a hollow conductor sphere represented in Fig. 10 will be stabilized and float in the field above the electromagnets. A partial explanation of the reason for stability is apparently that the conductor object is supported by a field that has a generally concentric average strength area which is more intense than towards the center of this area. The field may be considered as cup shaped. For example, in Fig. 4 let the distance of the curve $\phi$ from reference line O represent field strength and let point $c$ represent the center of the electromagnet system and the distance $d$ the diameter of a circle drawn through the three pole pieces, as in Fig. 3. The curve $\phi$ can then be imagined as a cross-sectional picture of the average field strength above the pole pieces taken across a diameter of the circle $d$. It is pointed out that curve $\phi$, Fig. 4, is not intended to represent flux polarity but merely field strength of an indefinite polarity. 17' represents the conductor platform cut in half and slightly tipped up to indicate that it is circular. If, now, the platform be moved sideways from center $c$ in any direction, for example in the direction of the arrow to the right, it is apparent that more area of the circular platform on its right hand side will come into the strongest area of the field on that side and less area of the circular platform will be subject to the strongest part of the field on the left side. More current will then be induced in the right side of the disk than in the left side and this produces an unbalance of the sidewise repulsion forces and a resultant sidewise repulsion force that resists the movement of the disk from center and returns it to center if it moves therefrom. The diametrical relation of the armature with respect to the horizontal effective area of the field must be within certain limits to obtain good stability. Best results appear to be obtained when the armature is of such diameter as to cover a part but not all of each pole piece when armature and field are symmetrically arranged. For example, in Fig. 3 the circle drawn through the three pole pieces may represent the armature size for good stability. The reason for this is apparently explained as follows. Suppose in Fig. 4 we represent one of the flux producing pole pieces at 14 and assume that the inner half of such pole piece is shaded by a closed band 16. Then from the well known shaded pole motor effect it is known that if a freely movable conductor such as 17' be placed above such pole, there will be an induction motor torque in the direction of flux shading or in this case inwardly towards the center $c$ as indicated by arrow F. If such shading coils were placed on the inner halves of all of the poles assembled about center $c$ then there would exist inwardly directed or stabilizing forces on the armature at all pole points. Such shading coils would then tend to maintain the armature centered in the field. It is seen, however, that the armature itself, if covering only an inner portion of each pole acts as a flux shader for each pole and produces these inward forces, and the additional shading coils on the pole pieces themselves for this purpose are generally unnecessary and are preferably omitted although they might be used in special cases. The armature 17' moreover floats some distance above the pole pieces and the flux has a chance to spread out and to be directed towards the center or towards the outside appreciably before it reaches the armature. Hence the exact diameter is not critical but may in a field like shown in Fig. 7 be even slightly larger than the outer periphery of the pole pieces and still provide a stable arrangement since the stray fluxes that do not return through the center pole tend to bend outward outside the floating armature and to produce inwardly directed repulsion forces on the armature which maintains it centered and stabilized.

The above explanation so far as it goes may not be entirely correct. My experiments indicate quite clearly that it is not complete. For example, if all upper pole pieces have the same polarity at any instant, stability is no longer present using pole pieces without individual shading coils. A four pole field with all upper poles alike as represented in Fig. 5 is unstable, but if two opposite poles be reversed as represented in Fig. 6, stability is obtained. Fig. 7 represents another very satisfactory stable field producing arrangement where circles 18 to 24 represent upper ends of core parts and 25 to 31 represent the energizing coils. In this case the outer circle of pole pieces are of one polarity at a given instant while the center pole is of the opposite polarity. This produces two concentric field areas separated by a weaker area. The connecting diagram for the coils may be as shown in Fig. 8. 32 represents a condenser merely used here for power factor correction. I have found that I may even omit the center pole of Fig. 7 if I use an armature of relatively small diameter.

Ordinary 60 cycle energy may be used but there is some advantage for specific problems in using a higher frequency such as 400 cycles or higher if it is available. The arrangement of Figs. 7 and 8 apparently produces a field which visualized in cross-section would look something like that pictured in Fig. 9 for pole pieces 23, 24 and 20. The field produced by this arrangement, Figs. 7 and 8, is so stable that an aluminum wash basin or disk of corresponding diameter may be thrown sideways into the field from a distance of ten feet to one side and the conductor platform will be caught so as to speak, stabilized and caused to float in the center of the field above the pole pieces.

The platform may be of any suitable non-magnetic conducting metal. However, a light weight metal such as aluminum or magnesium is to be preferred as the light metals will float higher or may be loaded heavier with other display devices.

In order to give some practical dimensions, but not by way of limiting the invention, the following data applied to the arrangement of Figs. 7 and 8 will give satisfactory results.

Diameter of core parts 18 to 24—3¼ inches
Length of cores—8¾ inches with 3 inches of core exposed below the coils
Coils, each—250 turns
Diameter between centers of opposite outer pole pieces—about 16 inches At 40 kva. input without power factor correction such an arrangement will float an aluminum disk about 19½ inches in diameter and ¼ inch thick approximately 3⅛ inches above the core top indefinitely. This disk may then be loaded with 13½ pounds of non-conducting material and still float about 1¾ inches above the core top.

The platform while floating centrally may be pulled by hand four inches to one side of center and then released and it will return to the center floating position by the centering repulsion forces.

The floating platform or platforms may take the form of some object for display or advertising purposes. For example, in Fig. 10 the stabilized field producing equipment may be hidden from view in a box 33 or table or beneath a floor and the floating object will appear to float above it without mechanical or other visible means of support and carry advertising material and so forth. This makes a mysterious and attractive display that attracts considerable attention. The object on display in Fig. 10 is a hollow metal sphere. Preferably the lower part 34 is made of thicker metal than the upper part 35. This serves to keep the sphere upright as it floats, provides the necessary conductivity in the repulsion flux field and makes the sphere lighter and hence causes it to float higher than it otherwise would. The upper part 35 of the sphere may, of course, be made out of a very light non-conducting material such as paper if that is desired. Preferably the sphere is made gas-tight and is evacuated or filled with a light gas such as hydrogen to increase its buoyancy and cause the sphere to float still higher than if it were filled with air. In such cases the sphere must not be made lighter than air since then the magnetic field would lose control of it. The sphere may be made to rotate more or less slowly as it floats by providing a small shading coil 36 (see Figs. 1 and 4) on one of the pole pieces. Very little rotational force is required because the floating object has no friction bearings other than the air. The elevation at which the display device floats may be varied by adjusting the input, or kva. in the coils, as by the adjustable transformer 37.

The speed of rotation, the direction of rotation, and the elevation of the display device may be controlled automatically to produce a wide variety of movements. For example, the shaded pole piece 23 is made rotatable and is rotated by a small motor 38 geared to a shaft 39 secured to the pole piece on its axis. The same motor may drive a crank 40 which slides the adjustable tap of the transformer back and forth in a guide 41. If the sphere be made of conducting material of uniform thickness, it will be rotated about an axis that varies from the vertical to the horizontal by rotation of the shaded pole.

It is evident that as the pole piece 23 is slowly rotated, the sphere shown will increase in speed in one direction, slow down and stop, reverse, speed up in the opposite direction, slow down, stop, reverse, and repeat the cycle. At the same time the elevation of the sphere will be varied by means of the adjustable transformer. The cycles of operation of the two automatic control devices may be different so that a wide variety of different display movements will occur. Instead of a sphere, the floating object may take any other form. For example, in Fig. 11 I have represented a display device in the form of a huge cake of soap. This will appear like a solid piece of soap, but it will be hollow for lightness and its bottom or preferably a circular central portion 42 thereof will be of conducting material of sufficient size and thickness to produce the necessary repulsion lifting and stabilizing forces. The remainder of the structure need not be of conducting material and may be of a light weight material. The structure may also be made air tight and be filled with a lifting gas as described in connection with the sphere of Fig. 10. It is seen that the dimensions of the display structure may extend well beyond the stabilized floating repulsion armature part 42 both laterally and vertically. If it is desired that the soap display device have the appearance of floating at an angle to the horizontal, a small inner weight in one corner will tip it to produce this effect without interferring with the repulsion suspension. Likewise a tipping action may be produced by varying the strength of the field on opposite diameters of the field area.

In Fig. 12 I have shown a display of electrical appliances such as a lamp 43, a fan 44, and a clock 46. These are mounted on the conductor platform 17a which may be a plain disk of aluminum covered with paper if desired. Lying on the platform or, if desired, concealed beneath or in a recess in the platform, is a coil of wire 45 in position to be cut by the alternating current flux that holds the platform in floating suspension. This coil of wire acts as the secondary of a transformer and an alternating current is induced therein. The number of turns with respect to the field strength is made sufficient to supply operating current to the lamp, fan and clock and is connected to the appliances as indicated. The fan may be positioned to blow at a tangent to the disk and produce rotation of the display. The coil may be so placed off center that as the platform rotates, the voltage induced in the coil varies appropriately to increase and decrease the brightness of the lamp and vary the speed of the fan. In such case the turning force produced by the fan should exceed the tendency of coil 45 to seek a rotative position where the flux is a minimum, as this also has a turning effect on the disk in a non-uniform circular field. Of course, the disk may be rotated as explained in connection with Fig. 10 if that is desired. If the electric clock is driven by a synchronous motor it will keep accurate time, if the frequency supply of the repulsion flux producing apparatus is of a standard correct frequency and the voltage supplied to the clock is not varied so greatly that its synchronous motor drops out of step. If desired, a track 47 may be provided about the edge of the platform and a small electric train 48 operated thereon, energized from a low voltage secondary coil 49. The weight of the train as it travels about the disk will cause the disk to tip accordingly by a slight amount and thus increase the floating sensation created by the display.

In Fig. 13 I have represented a display platform for advertising "floating power" automobile engines. The conducting repulsion armature disk is indicated at 17a in dotted lines. The representation of the engine may be of light weight material such as a cardboard or textolite on a light framework, but painted and shaped and of a size to resemble a real automobile engine. The structure may be provided with a small electric motor 50 resembling the regular motor starter and generator commonly found on automobile engines. The motor is energized from a secondary coil 51 and belted to drive certain exposed parts, such as the fan 52, and the clutch representation at 53 to create the impression of an engine in operation. Furthermore the engine representation may be supported on the platform disk 17a resiliently so that these parts may tip slightly with respect to each other. Then the drive shaft that extends from fan 52 to clutch 53 may be unbalanced as by providing an eccentric weight 54 on the clutch representation and making one fan blade heavier than the remaining blades. The engine representation will then vibrate somewhat when the motor is in operation, increasing the effectiveness of the display for the purpose intended.

The apparent mystery of this general type of display may be further increased in various ways and for various purposes. For example, in Fig. 10 I have shown an inconspicuous floor switch at 56 having an upward projecting rod 57 assumed to project through the floor and slightly above it so that a person may open the energizing circuit of the apparatus by stepping on rod 57. Another rod 58 to the same switch mechanism when stepped on closes the switch. Assume, now, that the apparatus is used on the theater stage as a part of the apparatus of a magician. He may come on the stage with the switch open and the display resting on the table top or he may bring the display device with him and place it on the table. Then he waves his magic wand over the sphere or speaks certain significant words, at the same time stepping on the circuit closing rod 58 and the display rises from the table and floats above it in a mysterious way. He may walk away and leave the apparatus in operation or wave his wand again and step on rod 57 and the display drops to the table. Similar switches on different parts of the stage connected in series as represented at 59 may be used to increase the mystery of the display. A similar switch may be included in the circuit of the control motor 38 for further modification of the act. In addition, or in place of the shading coil 36, the magician's wand may have on its end a flat circular disk 36a of conducting material which, if held in the position shown in and slightly to one side of the center of a flux pole, will produce a shading coil effect that will cause the display device to revolve in a direction which may be reversed by merely shifting the shading device 36a from one side of the pole to the other. It will be evident that the field pole structure should preferably be hidden from view by a table cloth or the like.

Fig. 14 represents a floating and rotating barber pole which is provided with internal or external lamps for illuminating purposes. The conductor supporting disk 17a comprises the bottom end of the pole and the remainder is of stiff paper or other suitable light weight semi-transparent material. The lamps 56 may be energized as explained in connection with Fig. 12, and the field structure indicated at 57 hidden from view and having one or more poles shaded to produce rotation of the display pole as it floats above the field at 57. Such a display should be protected from strong winds.

I have also found that, with the field apparatus of Fig. 7 and using a 19½ inch diaphragm-like diameter aluminum disk about 3/32 inch in thickness, within a certain temperature range of the disk at about the temperature where the disk becomes hot enough so that it is uncomfortable to touch, the disk is set into violent vibration in its non-rotating floating position and produces a loud note. When the armature is lifted by energization of the field, the disk starts to warm up, due to the flow of secondary currents therein. Its resistances thus change somewhat. At certain temperatures and resistances apparently a resonant vibrating condition exists and the disk vibrates with such energy that it produces a corresponding tone sound. The sound changes with changes in temperature until after sufficient change the sound dies away. Apparently this sound phenomenon is materially aided by reason of the fact that the disk is floating and there is no damping except that of the air. This is a fully suspended and efficient vibratory condition for a sound diaphragm which, so far as I am aware, has never previously existed, and I expect that further investigation will result in practical applications thereof in the field of acoustics. In any event I may make use of the phenomenon as a further means of attracting attention to the floating disk as a display.

The outer circular six pole field of Fig. 7 can be arranged to produce a rotating field without the aid of shading poles in any one of the usual ways, for example, by energizing different poles from different phases of a polyphase circuit or more simply by the split phase arrangement shown in Fig. 15. Here alternate outer field coils 25, 27 and 29 are connected in one group to one end of resistance 58 and the remaining outer field coils 26, 28 and 30 are connected as another group to the other end of this resistance. Both groups are energized through a contact 59 which is adjustable along this resistance such that any desirable part or all of the resistance may be included in one group or the other. When one group has a higher resistance in series therewith than the other group, a resistance split phase condition is created which sets up a rotating component in the outer field circle sufficient to produce rotation of the display device. This rotating component can be increased from zero value when the tap 59 is at the center of resistance 58 to an adjustable amount in either direction by shifting contact 59 toward one end or the other of the resistance. Very little phase displacement is necessary to produce rotation of the display disk.

Instead of being produced by a circle of individual poles the outer concentric field may be produced by a single concentric pole piece and a more simple coil arrangement as indicated in Fig. 16. Here I have represented in cross-section a central pole 60 and an outer concentric pole 61 and outer and inner concentric coils 62 and 63. The coils will be so energized as to give the instantaneous polarity indicated and the parts will be braced in the proper spaced relation and be proportioned to give the type of field desired. In all cases the field poles will preferably be laminated to reduce eddy current losses. Very thin steel 1½ mils thick was used for frequencies between 400 and 2000 cycles.

I have found, referring to the cross-section view of the apparatus in Fig. 16, that the flux passing up through the axial core 60 and returning through the ring core 61 should be approximately ½ as great as the leakage flux following the outside path around coil 62 and passing through 61. This is also true of the Fig. 7 apparatus with the seven coils. The disk should be somewhat larger than the average diameter of the ring core 61.

In increasing the size of the apparatus it will be desirable to keep the magnetic field at similar points the same, a limitation imposed by the finite saturation value of iron. Under these conditions the supporting force will increase with the square of the linear dimension, the power dissipation in the disk will increase in the same way, leaving the average heating per unit area unchanged, the height of rise will be proportional to the linear dimensions, the kva. rating will increase as the cube of the linear dimensions, and the copper loss in field coils will increase as the first power of the linear dimension. The latter consideration will make it possible in a large apparatus to increase the weight of copper and iron less rapidly than the cube of the dimension and to distribute the field coils more effectively for the purpose of throwing the flux upward. Sixty cycles seems the best practical frequency, especially since that is the conventional supply frequency.

The stability can best be understood by considering cases in which stability is not attained. If no current is passed through 63, we have the situation shown in Fig. 16a where all the flux from the upper end of 61 together with some flux which has passed through the interior of 61 must pass outward between 61 and the disk above it. The eddy currents generated by the horizontal flux in contact with the disk give plenty of supporting force, but there is insufficient force tending to prevent the disk from tipping, as indicated in the figure, from position I into position II. It will be seen that in the transition the flux manages to escape more and more completely past the edge of the disk so that the upward force decreases rather than increases as it should to maintain stability. On the other hand, it will be seen that if the disk in Fig. 16 tilts in similar fashion, the flux from 60 to 61 becomes more and more crowded underneath the disk in the neighborhood of 61 with the result that the force is augmented and stability against tilting is obtained.

Another type of instability arises if the outer flux, that is, the flux that circulates about coil 62 is too small. Then the disk tends to slide off sidewise. Referring again to Fig. 16, the lines $L_1$ and $L_2$ mark the limiting lines of force passing between 60 and 61 toward the right. All the lines to the right of $L_2$ pass around 62 and back to the lower leg of 61. Apparently the flux $L_2$ is forced outward to a greater radius as it leaves 61, as shown, by the compressive action of the disk on the lines of force. This would bring the marginal lines of flux $L_2$ on the disk quite close to its edge. Thus in its normal position the disk floats almost exclusively on the $L_1$ flux from 60 to 61 with little support from the outer flux. Under this condition the current circulating around the disk at its outer edge is negligible. If, now, the disk be supposed to move toward the right the outer flux field generates current in the right-hand edge in the proper sense to push the disk backward. At the same time the leakage of inner flux $L_1$ past the left-hand edge of the disk is very small, because this flux does not tend to escape to large distances, but must return immediately to 61. Accordingly, the force arising from it which tends to increase the displacement of the disk is very small, and the restoring force at the right hand edge easily overcomes it.

With the apparatus of Fig. 16 using a 15 inch diameter armature ¼ inch thick and other dimensions in proportion as represented. I find that a seven pound weight of lead 65 may be centrally supported on a cardboard support 66 at and about 5 inches above the armature without rendering the apparatus unstable. Under these conditions the armature will float nearly two inches above the pole pieces 60 and 61. I believe the lifting slope of the field may be improved by inserting stationary segmental conductors 83 above coils 63 in Fig. 16 to decrease the flux leakage directly above the coil and force it to pass near the armature 17a. Additional concentric ring pole pieces and coils of alternating polarity may be added to extend the area of lifting field.

Fig. 17 represents a further display feature in which 17a is a floating disk armature positioned above a seven pole field of the character represented in Fig. 7. On the surface of the disk is a plurality of small magnetic particles 64. Preferably these particles are small sphere-shaped permanent magnets of high coercive force with opposite poles on opposite ends of an axis therethrough. Sintered oxide which is light in weight and adapted to make good short permanent magnets may be used for this purpose.

When the suspending A. C. field is not present and the disk 17 is resting on the upper surface structure thereof, the magnets 64 will tend to collect above the individual field poles in groups as represented. Those in a group will also tend to cling to one another. When the field is applied and the disk is lifted, the small sphere magnets will be agitated and perform all sorts of antics. They will tend to reverse with each reversal of the A. C. field. They will tend to line up with the major flux axes. They will be further impelled by the presence of eddy currents in the disk. If the disk is rotated as previously described, this will further change the performance of the magnets both by reason of the presence of a rotating A. C. field component and the rotation of the disk. As the A. C. flux reverses and passes through zero value, centrifugal force is permitted to act on the magnets momentarily and they tend to move towards the periphery only to be pulled back as the A. C. flux rises in the opposite direction. These small sphere magnets may be of different sizes and of different colors and some may have their north pole halves of one color and a contrasting color over the south pole halves. A wide variety of unusual visible effects can thus be produced.

Another practical use of my invention is shown in Fig. 18 and consists of a centrifuge driven at high speed by my apparatus used as or in combination with a motor. It is noted that the parts 60 to 63 represent a lifting and stabilizing field such as described in connection with Fig. 16. This cooperates with a floating armature 17' contained within a glass bell jar 66, or the like. The bottom closure of the bell jar may comprise a glass plate 67. Supported on floating armature plate 17' is the secondary 68 of a three phase, two pole induction motor, the stator of which is shown at 69 surrounding the bell jar. Supported above secondary 68 is a vessel 70 adapted to contain the liquid to be treated to centrifugal force. The parts 17', 68 and 70 are suitably fastened to each other and are mechanically balanced with respect to the vertical axis through armature 17' and centered with respect to the supporting field and the stator 69 of the induction motor when floating on the stabilized lifting flux field. The bell jar may be provided with a valved outlet 71 in order that the air may be exhausted and replaced by an atmosphere of hydrogen for example. Part 72 is a circular guide of non-magnetic, non-conducting material into which the armature 17' settles when the lifting field is removed.

The operation of this apparatus is as follows. The liquid or other material to be treated is placed in vessel 70 and the vessel closed. The bell jar 66 and stator 69 are assembled, as shown, and the bell jar suitably evacuated and filled with hydrogen, if that is desirable. Hydrogen is suggested as it acts as a cooling medium and offers less resistance to rotation than does air. The lifting and stabilizing field is then applied and adjusted until the floating parts are in the position represented. The induction motor is then energized and the floating parts brought up to the desired speed by raising the frequency on the induction motor. The field produced by this motor must be nicely balanced and the rotor 68 centered therein. Extremely high speeds are possible with a relatively small power induction motor because the rotor assembly has no bearings or bearing friction and windage is reduced to a negligible amount. If a 2000 cycle frequency source of supply is used, the speed will be 120,000 R. P. M. less the small slip of the induction motor, but it may require several minutes to reach such speeds.

After the centrifuge operation is completed, the frequency supplied to the induction motor is lowered and the speed is reduced accordingly and finally this motor is deenergized and the apparatus allowed to slow down. When a suitable lowered speed is reached, the lifting field may be reduced to gradually lower the rotor assembly into guide 72 where it is then quickly brought to rest by braking action as the lifting field is removed.

The only limitation on the speed with such an arrangement is that due to the strength of the materials used in the rotating parts. These must be sufficient to withstand the centrifugal forces involved. At high speeds there is a gyroscope stabilizing action, as in spinning a top.

Figs. 19, 20 and 21 represent cross-sections of other possible modifications of the invention where there is no substantial flux field circulating external to the electromagnet. In all of the modifications the electromagnet has a unitary core closed at its bottom and having a central pole piece 73 and a concentric circular pole piece 74 of opposite polarity. A single alternating energizing coil 75, as shown in Fig. 19, is used. In these modifications stabilization is obtained by properly shaping the field and floating armature at and adjacent their centers. In Fig. 9 the central pole of the field is lower than the outer pole and also is recessed at its center. The floating armature 76 has a V-shaped cross-section with the point of the V pointing downward at the center. It is obvious that the point of the V tends to remain in the weak field at the center of the pole piece and if it moves to one side in any direction, it moves into a stronger field and is resisted.

In Fig. 20 the central pole 73 is higher than the outer pole and is rounded. The armature 77 has a raised central portion. If this armature tends to move sidewise it encounters counter balancing induction forces which resist such movement. Fig. 21 is much like Fig. 20, except that the armature 78 is flat but has a circular opening at its center. In the arrangements of Figures 16, 19, 20 and 21 the features for rotatively driving the armature have been omitted.

In all of the above described modifications, the floating armature has been described as circular and in most cases the field has been circular or nearly so. While the circular arrangement appears to be preferable, my experiments have indicated that this is not essential and in Fig. 22 I have indicated in plan view outline an oblong field and floating armature that may be used. In this case the outer row of individual poles 79 are of one polarity while the central long pole 80 is of the opposite polarity. The armature may be rectangular and of the general size and shape represented in dotted line 81.

Instead of driving the centrifuge of Fig. 18 by a separate induction motor, I may use a polyphase field-producing electromagnet for simultaneously producing the stabilized floating action and high speed rotation of the armature. A plan view of one pole piece arrangement and circuit connections for this purpose is shown in Fig. 23. An armature 17' indicated in dotted lines may carry electrical display apparatus such as a lamp 56 energized by a secondary coil 45 secured to the upper surface of the armature. Here electromagnets 85, 86 and 87 are connected in delta to a three-phase adjustable voltage source of supply 88. Electromagnets 89, 90 and 91 are connected in delta to another source of three-phase supply of adjustable voltage 92.

We thus have two symmetrical three-phase field-producing means. I have found that one such three-phase field acting alone, such as will be produced by electromagnets 85, 86 and 87, gives good stability and causes high speed rotation of an armature floated thereby. When both three-phase fields are energized, the lifting and stability forces are increased. With this arrangement any speed in either direction from zero upward to the mechanical speed limits of the device can be obtained. If the two fields are connected for reverse phase rotation and are energized at the same frequency, no resultant rotational field will be present and the armature will float without rotation. Now the voltage on one three-phase field arrangement may be reduced and rotation in the direction of phase rotation of the stronger field will result at a speed proportional to the difference in the two oppositely rotating field strengths. Then the weaker field may be reduced to zero and its phase rotation reversed and its strength increased so that both fields act in the same direction of rotation. Also, the frequency of both fields may be varied to obtain practically any speed desired. Each three-phase field is in effect a two-pole rotating field. The beneficial stabilizing effect of having poles of opposite polarity facing the armature as previously explained is obtained here by reason of the difference in phase of the fluxes at different pole pieces of three-phase group. No central pole is required and the diameter of the armature is not critical but a diameter of approximately the circle drawn through the centers of the pole pieces is recommended. A centrifuge using such a combined motor and repulsion suspension may be built otherwise like shown in Fig. 18 but with parts 68 and 69 omitted.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Inductive repulsion apparatus comprising alternating current electromagnetic apparatus having upwardly facing spaced pole pieces of opposite magnetic polarity for producing an alternating flux field in a region of appreciable lateral dimensions above said electromagnetic apparatus and an armature of conducting material of such weight and lateral dimensions as to be suspended in said field above said pole pieces by repulsion, the relative shape and size of said field and armature being such that the armature is stabilized within such field by inwardly directed repulsion forces thereon and can be maintained suspended by such field indefinitely solely by the lifting and centering repulsion forces produced between said electro-magnetic apparatus and said armature of conducting material.

2. Inductive repulsion apparatus comprising alternating current electromagnetic apparatus having laterally spaced pole pieces of opposite magnetic polarity for producing an alternating flux field in a generally horizontal circular region above said pole pieces, said field having generally concentric areas of different average strength, and an armature of conducting material maintained suspended in said field above said pole pieces by repulsion, said armature being so dimensioned and shaped with respect to the dimensions and shape of said field that the armature is stabilized centrally of said field by centering repulsion forces.

3. Repulsion apparatus comprising alternating current electromagnetic means having upwardly facing spaced pole pieces of opposite magnetic polarity and of unequal flux strength such as to produce a generally horizontal flux in the region above and between said pole pieces and an additional leakage flux generally surrounding the first mentioned region and an armature of conducting material of such size and shape as to be held suspended above said pole pieces by the lifting and centering repulsion action of said fluxes.

4. Repulsion apparatus comprising alternating current flux producing apparatus for producing an alternating flux field in a generally horizontal circular region in which the magnetic field intensity is greatest at the bottom of said region and is approximately symmetrical horizontally with respect to the center of said region and a substantially circular armature of conducting material held suspended in said field by upward lifting and radial centering repulsion forces caused by interaction of said fluxes and currents induced in said armature by said field.

5. Repulsion apparatus comprising alternating current electromagnet means for producing an alternating flux field in a region above said electromagnetic means which field diminishes in average intensity from the bottom towards the top, is generally circular in horizontal section, and has generally concentric areas of different intensity and a circular, disk-shaped armature member of conducting material held suspended by said field in approximately a horizontal position and centrally of said field by repulsion forces which have both a lifting component and a centering component on said armature.

6. The method of maintaining a heavier than air member of conducting material floating in space, which consists in subjecting the region beneath, and about the lateral margins of said member to alternating flux fields of sufficient strength to produce upwardly supporting and laterally supporting repulsion forces on said member.

7. Repulsion apparatus comprising means for producing an alternating flux field in a generally horizontal circular region, means for causing said field to have a component of rotation about the vertical central axis of said region, an armature member of conducting material maintained in suspension in said field by upward repulsion forces thereon and caused to rotate by induction motor action due to the rotating component of said field, said armature being of a size and shape with respect to the size and shape of said field that it floats in said field in a region where any tendency of the armature to move sideways therein from a central position is opposed and successfully resisted by radial repulsion forces.

8. Repulsion apparatus comprising electromagnetic means for producing an alternating flux field in a generally horizontal circular region of substantial depth, said field having a substantially uniform average intensity layer generally in the shape of a cup and an armature of conducting material maintained in stabilized suspension in said field by upwardly and inwardly directed repulsion forces thereon.

9. Repulsion apparatus comprising electromagnetic means for producing an alternating flux field in a generally horizontal circular region of substantial depth, such field being more intense in the lower than in the upper portion of said region, and an armature of conducting material of "wash basin" shape maintained upright in stabilized suspension in said field by upwardly and inwardly directed repulsion forces thereon.

10. Repulsion display apparatus comprising electromagnet means for producing an alternating flux field above said electromagnetic means having inner and outer horizontal regions of different magnetic intensity, an armature of conducting material constituting a display support of such size and shape with respect to the field as to be maintained in stabilized suspension by said field due to repulsion forces thereon and without other means of support, non-magnetic, non-conducting covering material between said electromagnetic means and armature for hiding the electromagnetic means from view, and means for varying the character of the repulsion forces acting on said display armature to cause motion thereof while it is thus maintained in stabilized floating suspension.

11. Repulsion display apparatus comprising electromagnet means for producing an alternating magnetic field above said electromagnetic means, said field being generally symmetrical in a horizontal plane with respect to a common center and having inner and outer horizontal regions of different magnetic intensity, an armature of conducting material of such size and shape as to be maintained in stabilized floating suspension in said field by repulsion forces and without other means of support, and electrically operated display means supported on said armature while so suspended and energized by induction from said field.

12. Repulsion display apparatus comprising electromagnet means for producing an alternating magnetic field above said electromagnetic means, a display float including an armature of conducting material acted on by repulsion in said field, said field having such strength and flux distribution in relation to the size, weight, and shape of the armature that the display float is maintained in stabilized floating suspension in said field by repulsion forces, said float including a lighter than air, gas-tight compartment to increase the buoyancy of said float.

13. Repulsion apparatus comprising electromagnetic means for producing an alternating magnetic field, an armature of conducting material within the influence of said field, said field having such strength and flux distribution in relation to the size, weight, and shape of said armature that the latter is maintained in stabilized floating suspension in said field solely by repulsion forces acting thereon, said electromagnetic means and armature also comprising the stator primary and rotor secondary respectively of an induction motor, said apparatus being designed to perform both its stabilized suspension and induction motor actions simultaneously, whereby the motor requires no bearings.

14. Repulsion apparatus comprising a circular diaphragm-like armature of conducting material, electromagnetic means for producing an upwardly directed alternating flux field on said armature sufficient to maintain the armature in floating suspension in a horizontal position by repulsion forces, said field having an effective distribution of greater horizontal dimensions than the horizontal dimensions of the armature whereby the armature is also supported centrally of said field by inwardly directed repulsion forces, said armature having such dimensions, resistance, and weight as to be set into audible vibration by said supporting field.

15. Repulsion apparatus comprising a circular group of electromagnets for producing an upwardly projecting polyphase rotating magnetic field, and a circular armature of conducting material of lesser diameter than the outer limits of the upwardly projecting field produced by said electromagnets maintained in stabilized floating suspension centrally of and in said field by repulsion forces and rotated as the secondary of an induction motor by said field while so maintained in floating suspension.

16. Repulsion apparatus comprising a circular group of 2 N electromagnets, N being a number greater than one, a source of alternating current supply for energizing alternate electromagnets of said group to produce a rotating upwardly projecting alternating magnetic field, another source of alternating current-supply for energizing the remaining electromagnets to produce a rotating upwardly projecting alternating magnetic field, said two sources being independently adjustable, a circular armature of conducting material of lesser diameter than the outer limits of the upwardly projecting field produced by said electromagnets capable of being supported in stabilized floating suspension by repulsion forces produced by either of said fields and to rotate centrally of the supporting field as the secondary of an induction motor while so suspended.

17. The method of maintaining a member of conducting material floating in space which consists in both counteracting the force of gravity thereon and in stabilizing said member solely by upwardly and laterally directed alternating magnetic flux repulsion forces.

LYLE H. B. PEER.